F. M. THOMAS.
AIR LINE HOSE COUPLING DEVICE.
APPLICATION FILED MAY 2, 1917.
1,261,318.
Patented Apr. 2, 1918.
3 SHEETS—SHEET 1.
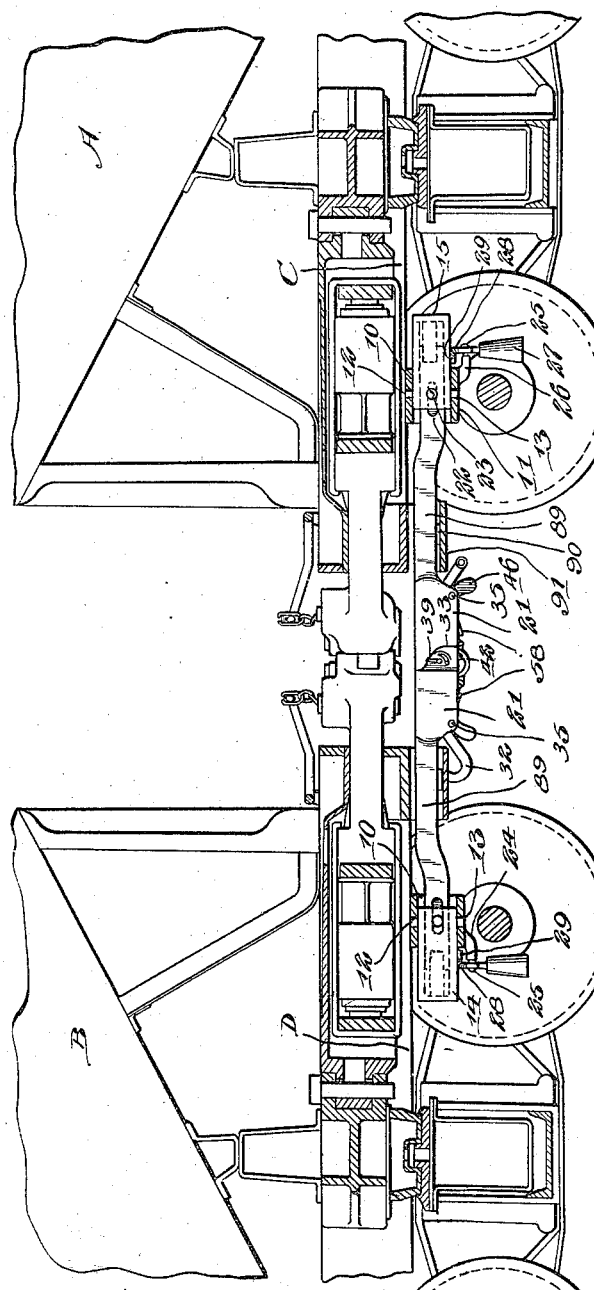
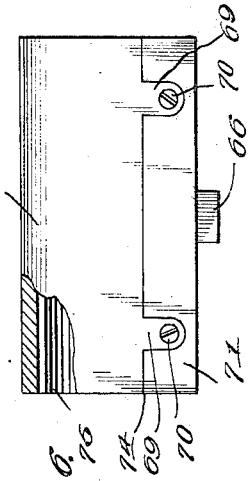
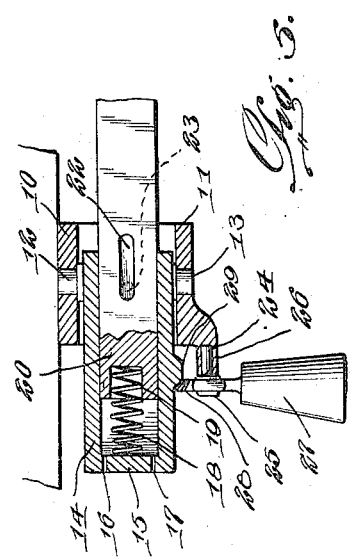
WITNESSES
INVENTOR
F. M. Thomas.
BY Victor J. Evans.
ATTORNEY

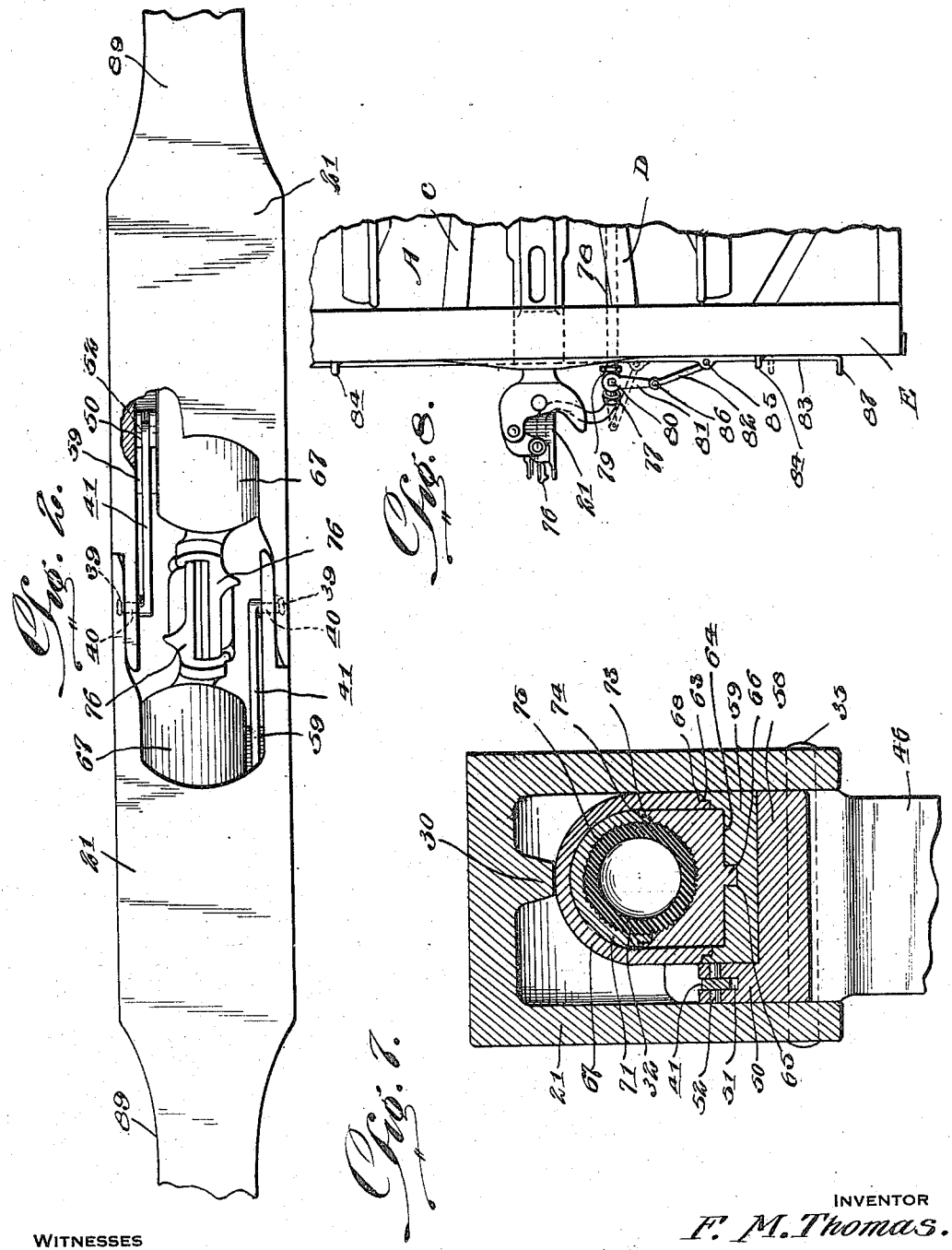

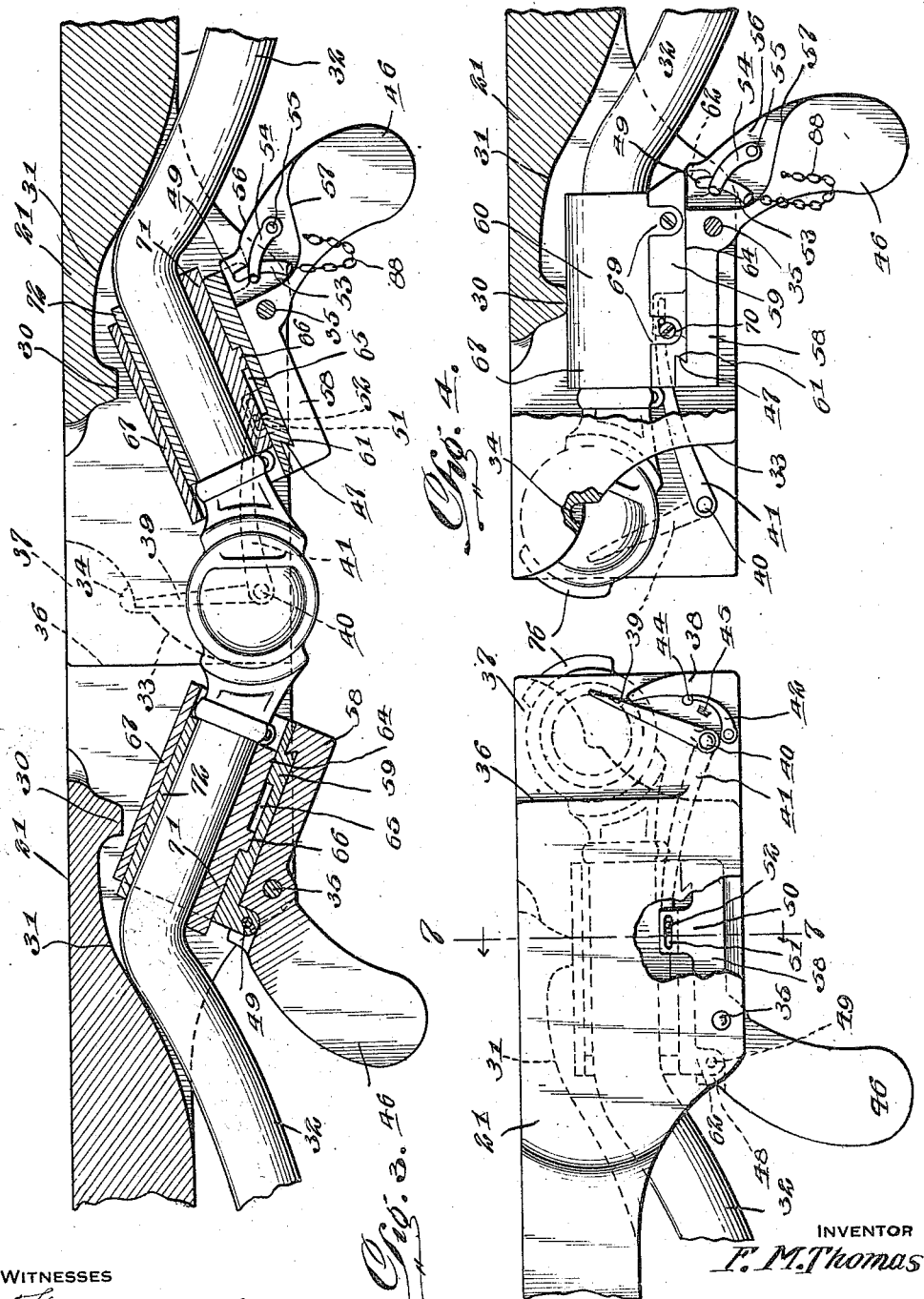

UNITED STATES PATENT OFFICE.

FRANK M. THOMAS, OF PIGGOTT, ARKANSAS.

AIR-LINE-HOSE-COUPLING DEVICE.

1,261,318.  Specification of Letters Patent.  Patented Apr. 2, 1918.

Application filed May 2, 1917. Serial No. 165,942.

*To all whom it may concern:*

Be it known that I, FRANK M. THOMAS, a citizen of the United States, residing at Piggott, in the county of Clay and State of Arkansas, have invented new and useful Improvements Air-Line-Hose-Coupling Devices, of which the following is a specification.

This invention is an automatic air line hose coupling device which avoids the necessity of a train-man passing between the ends of the cars to couple and uncouple the air line.

In present day practice, the air hose on the end of the air-line dangles or swings from the end of the car and the couplings sway to and fro near the road bed, from which are picked up stones, etc., which are liable to and do injure the hose and couplings.

It is also necessary that a train-man pass between cars to couple and uncouple the air line hose, which operation is dangerous and should be avoided to comply with a simple rule of "safety first."

To avoid the dangers and delays incident to coupling and uncoupling of the cars composing the train, this invention has for one of its objects to provide a coupling device that is automatic in its action and utilizes the standard hose coupling and screw connection employed upon the railroads using the automatic air brake system.

Another object is to provide a coupling device that is automatic to produce the movements necessary to couple the standard couplings, such as the M. C. B. (Master Car Builders' standard) together, and thereafter to hold them in operative position a sufficient distance from the road bed to prevent injury therefrom.

A further object is to provide a coupling device wherein the longitudinal movement will be as great as the allowance for the draw-bar pull, which varies according to the length of the train and the weight of the cars.

A still further object is to provide a coupling device wherein the horizontal movement is compensated to bring the couplings into a coupling or uncoupling position irrespective of the banking of the track or the angle of inclination of the car to the ground.

One purpose of the invention is to produce an automatic coupling device that may be used in connection with the present air hose line and coupling so that a car equipped with the automatic coupling device may be coupled with one not so equipped.

Another purpose is to provide operating levers connected with the air cock valve stem so that the air cock may be controlled from either side of the car, which levers are adjacent the car coupling or operating lever so that the coupling and uncoupling of the car and the shutting off and turning on of the air may be done practically simultaneously.

A further purpose of this invention is to provide a device wherein the standard air hose is firmly held in a separably clamp, which clamp is adapted to move within a housing detachably secured to a carrier, the housing and clamp being so formed as to admit of the quick replacement of the air hose and its coupling under traffic conditions.

The invention, broadly stated, comprises a socket member pivotally mounted upon the under side of the car beneath the regular car coupling, a casing mounted within the socket member for movement therein, a resilient member interposed between the bottom of the socket and the end of the casing, said casing being provided at its other end with a slotted opening, one side of the said casing being substantially flat, which side at its juncture with the end of the casing being provided with an irregularly curved end having a recess, the other side of the casing being substantially rectangular, the forward portion of this side being thinner in cross section than the after part and being provided with an aperture through which passes a shaft, said shaft being provided with an arm adapted to move in this thinner section so as to lie below the plane of the side, a plurality of lugs adjacent the forward end of this end section, and a latch adapted to coöperate with one of the lugs, said arm being adapted to coöperate with the latch and also with the lug, a carrier pivotally mounted within the casing, which carrier consists of an L-shaped member having a counter-balance at one end operating to maintain the carrier in a horizontal position, said carrier being provided at its forward edge with a V-shaped notch extending transversely, and toward the counter-balance end with a recess or slot, said recess or slot being provided with an aperture or hole which extends through both sides of the slot, a pin for the aperture, and a latch for said pin, a separable housing comprising a base member having adjacent its forward end a V-shaped notch extending transversely and adapted to coöperate with the V-shaped notch of the carrier, a projecting lug at its rear end provided with an aperture to coöperate with the pin of the carrier, said lug being adapted to seat within the slot or recess formed in the counterbalance end of the carrier, the upper side of said base portion being grooved and provided with suitable recesses in which are disposed threaded holes, shouldered portions extending longitudinally, a slot formed substantially centrally of the body portion, a top portion of curved outline having its free edges provided with shoulders to engage with the shoulders of the body portion, lugs extending from said shouldered portions provided with suitable apertures to engage with the recesses formed in the body portion, holding means passing through the lugs into the threaded holes or recesses to secure the body and upper portion together as a unitary structure, and presenting a relatively smooth exterior surface, a clamp composed of separable sections, the interior surfaces of which are corrugated and secured together in a manner similar to that of the separable housing, the under side of the body portion of the clamp being provided with a lug to operate within the slot formed in the body portion of the housing, so as to admit of the movement of the clamp, the hose and its coupling to compensate for the variations in draw-bar pull, said carrier being provided at one side with suitable lugs provided with elongated slots, the lugs serving to space the housing from the casing upon one side, and the slots by means of a pin and arm connected to the arm and shaft before mentioned serving to move the forward end of the casing downward upon movement of the first-mentioned arm against the counter-balance at the end of the carrier, when said arm engages with the curved end of an opposing casing, said slot within the casing being adapted to contain the carrier, the hose clamp, the housing therefor, and the coupling for the air hose, and a lever extending transversely of the car at the coupling end, which lever is operatively connected with the air cock to control the flow of air through said cock by manual means on the coupling and uncoupling of the air hose, which control may be gained simultaneously with the withdrawal of the pin from the car coupling, said housing being adapted to contact with the lugs on the carrier and the upper face of said carrier, the side of the casing, and with a projecting lug formed on the inner top wall of the casing, which several contact points operate in conjunction with the V-shaped notches of the carrier and the body portion of the housing, and the lug which is adapted to seat in the recess or slot, to serve to maintain the housing in a rigid manner when so assembled, so as to provide a strong construction not easily affected by the conditions incident to service.

One practical form of construction will be described and illustrated in the accompanying drawings, in which:—

Figure 1 is a side elevation, partly in section of the ends of two cars with the coupling device attached in a coupled position;

Fig. 2 is a plan view of the two coupling devices in an operative position;

Fig. 3 is a longitudinal sectional view of the two devices in a coupled position;

Fig. 4 is a side elevation partly in section with the coupling devices separated, showing them in an uncoupled position;

Fig. 5 is a sectional view showing the buffer end, socket member, and compensating devices for the end of the casing;

Fig. 6 is a side elevation, partly in section to show the manner of connecting the two portions of the housing and also the air hose clamp;

Fig. 7 is a sectional view on the line 7—7 of the left-hand coupling device, shown in Fig. 4; and Fig. 8 is a top plan view of the end of a car, showing the several sills and cross members, and indicating the manner of attachment for the control of the air hose valve or cock.

In the preferred embodiment shown, two cars A and B are provided with the coupling devices, which as illustrated in Fig. 1 indicates them as being secured to the longitudinal sills C and D.

The securing means is preferably a U-shaped member, the upper and lower walls of which are indicated at 10 and 11. This U-shaped member is provided with suitable holes which pass through the walls 10 and 11 in a vertical direction. Adapted to be seated within these holes are the pins 12 and 13 carried by the socket member 14. This socket member 14 is preferably rectangular in outline, and the socket pin is also preferably rectangular. One end of this socket is open while the other end is closed as indicated at 15, and extending longitudinally through this end 15 are the holes indicated at 16 and 17. These holes are for the purpose of permitting air to pass in and out.

Adapted to be positioned within this socket member is a spring 18, which is preferably of the coiled variety, one end of which spring abuts against the end 15 of the socket member, while the other end rests within a suitable socket 19 formed in the end 20 of the casing 21.

At a suitable point on this casing and upon two sides thereof are elongated slots, one of which is indicated at 22, and to coöperate with these slots and to ride therein are pins 23, which project inwardly from the inner walls of the socket member 14. These pins and the slots 22 serve to limit the movement of the casing 21 within the socket member 14 in coöperation with the action of the spring 18.

Disposed upon the bottom wall 11 of the U-shaped member and projecting therefrom is an arm indicated at 26. This arm may be provided with a threaded hole 24 to coöperate with a threaded bolt 25, the threaded portion of this bolt being indicated at 26. The bolt 25 is adapted to provide a bearing for a counter-balance or weight 27, which is provided with an arm and a suitable aperture to form a bearing portion with the pin 25, and its free end carries a segmental gear 28.

The segmental gear 28 is adapted to coöperate with suitably formed and positioned teeth composing the rack 29, which is disposed upon the bottom wall of the socket 14.

The movement of the casing 21 by means of its arm and in coöperation with the socket member 14 permits of a pivotal movement by means of the pins 12 and 13, and a longitudinal movement by means of the slots 22 and the pins 23, and the counterbalance weight 27 swinging from one side to the other due to the banking of the track and the inclination of the car body relative to the ground, will swing the forward end of the casing 21 to its proper position.

The movement of the counter-balance weight 27 is communicated to the teeth 29 by means of the segmental gear 28, which tends to swing the rear end 20 by means of the socket 14. The casing 21 is provided at its forward end or forwardly of the pivotal mounting with a slotted end, and in the upper wall leading toward the slot, there is formed a lug indicated at 30. The upper wall of the casing is of varying thicknesses, and is preferably of a curved outline, as indicated at 31, so that the air line hose indicated at 32 may ride freely into contact therewith.

The forward end of the casing upon one side is provided with a curved edge indicated at 33, and at a suitable point in this edge, there is formed a recess 34. The contour of this curved edge and its recess are more clearly shown in the right-hand portion of Fig. 4. Adjacent the lower and rear end of the slotted portion, there are provided suitable holes through which passes a pin 35. The opposite side of the casing 21 is provided with a shouldered portion, which makes this side thinner in cross section, the shoulder formed between the thicker and thinner sections being indicated at 36.

The thinner section, which will be designated by the numeral 37 is provided at its lower forward end with a curved lug 38. This lug 38 curves upwardly and inwardly, and is adapted to contact with an arm 39. The arm 39 is mounted upon a shaft indicated at 40, which passes through a suitable hole formed in the section 37, and projects inwardly a sufficient distance to connect with a second arm 41.

Disposed below the shaft 40 is a latch 42 which may be formed of resilient material, and is pivotally mounted as shown. This latch may be provided with a handle, as indicated at 44, which handle also serves as a stop, which is adapted to engage with the arm 39.

In order to hold the latch 42 in active position, the lug 45 is provided, which when the latch 42 is moved to the left, as indicated in the left-hand portion of Fig. 4, will hold the latch 42 so that its handled end 44 will engage with the arm 39, to limit the movement of the latter.

The opposing edges of the casing 21 are preferably formed so as to provide a perfect and easy engagement which is more clearly shown in Fig. 2. In this figure, the curved edge 33 is adapted to substantially abut against the shoulder 36 formed on the opposing casing, at which time, the end of the arm 39 rests or lies within the recess 34.

The pin 35 is provided to form a pivotal mounting for the L-shaped carrier member, whose depending portion is formed as a counter-weight or balance 46, which counter-balance or weight projects outside and below the casing 21. The other portion 58 of this carrier member is preferably provided with a flat face, and at its forward end there is provided a V-shaped notch 47, which extends transversely of the forward end.

Adjacent the meeting point or juncture of the two parts of the L-shaped carrier, there is formed a slot or recess 48. This slot or recess is provided with suitable apertures formed in both sides thereof, through which passes a pin indicated at 49.

Disposed at a suitable point upon one side of the flat portion of the carrier, is a projecting lug 50, which is provided with a slot 51, while intersecting the slot is a bore, through which passes a pin 52. One side of this lug is adapted to coöperate with a side wall of the casing 21, and the pin 52 serves to provide an operative connection with the arm 41, which connection is shown more clearly in the left-hand portion of Fig. 4. The pin 49 is preferably removable from its engagement with the holes which pass through the carrier, and as shown is provided with a curved end indicated at 53.

In order to prevent accidental removal of this pin 49, a latch indicated at 54 is provided. This latch may be of any usual or customary type, and is shown as being pivotally mounted as indicated at 55 and curved in outline so as to engage with the curved section 53 of the pin 49. The curved end 53 of the pin 49 and the latch 54 and its pivotal mounting 55 are adapted to rest or lie in a recess indicated at 56, the shoulder forming the outline thereof being indicated at 57.

Disposed to coöperate with the carrier, and with the flat face of the portion 58 is a suitable housing, which comprises a body portion indicated at 59 and an upper curved portion indicated at 60. The base or body portion of this housing 59 is preferably provided with a flat under surface to coöperate with the flat surface of the portion 58 of the carrier, and is further provided at its forward end with a V-shaped notch and recessed portion 61, which is adapted to coöperate with the V-shaped notch 47.

Both of these notches or recesses 47 and 61 extend transversely, and therefore afford a wide and firm engagement with each other. Extending from the under flat surface of the body portion 59 at the rear end thereof is a lug 62, which is provided with a suitable hole through which passes the pin 49.

When the lug 62 is seated in the slot or recess 48 and the pin 49 is inserted through the recesses or holes, the body 59 is firmly held against movement, and when in an assembled position with the parts hereinafter to be described, this base or body portion 59 is retained against side movement by means of one of the side walls of the casing 21 and the lug 50.

The body portion 59 is preferably provided with longitudinaly extending shouldered portions 63. The upper surface 64, which lies between the shouldered portion 63 is preferably flat, so as to provide a bearing surface for another body. Disposed substantially centrally and in a longitudinal direction is a slot indicated at 65, which is adapted to coöperate with a lug indicated at 66.

The upper portion 67 of the housing is preferably curved and is also provided with shoulders 68 upon the walls thereof to engage with the shoulders 63 formed upon the walls of the body or base portion 69.

To removably secure the upper portion to the base or bottom portion of this housing, suitable means are employed, which means are shown in Fig. 6. While this figure is for the air hose clamp, the method of joining the two sections together are similar, and the reference characters applied thereto will apply to the housing as well as to the air hose clamp. The upper portion is provided with lugs indicated at 69, which lugs are provided with suitable holes, through which may pass the screws 70.

Disposed in the base or body portion are suitable recesses provided with threaded holes, which recesses are adapted to coöperate and have seated therein the lugs 69, and the screws 70 may be inserted into the threaded holes so as to firmly seat the lugs in their respective recesses. When so assembled, the exterior surface is substantially flat, and therefore no projections are found, which makes this exterior surface smooth.

The air hose clamp, which is illustrated more particularly in Fig. 6, is also formed of separable sections, the body portion of which is indicated at 71 and the upper portion at 72. The body or base portion 71 is provided with a flat under surface, and at a suitable point there projects the lug 66, which is adapted to coöperate with the slot 65 formed in the base or body member 59 of the housing. The base portion 71 is also provided with shouldered walls indicated at 73, which are adapted to coöperate with the shouldered walls 74 of the upper portion 72.

The inner surfaces of the two portions 71 and 72 are preferably corrugated, as indicated at 75, so as to firmly clamp the air hose to maintain it in its operative position relative to the clamp and to the housing. The two portions of the air hose clamp are provided with suitable lugs, and recesses which are adapted to be placed in engagement and seat in a manner similar to that described for the housing.

The air hose 32, the coupling 76, and the screw connection 77 are of the type prescribed by the M. C. B., and they are standard equipment upon all trains using the automatic air brake system.

This device by reason of its construction, is adapted to use standard equipment, and therefore requires no changes in existing devices. The invention contemplates mounting the air hose clamp and its housing upon the air hose so that replacements under traffic conditions due to hose breakage or other derangements may be quickly effected, and is therefore designed to become a part of the standard air hose equipment.

The air pipe indicated at 78 is provided with a cock 79. The cock 79 is provided with a stem indicated at 80, to which is secured an arm 81 and connected to this arm 81 is a link 82, which is connected at its other end to an operating lever 83. The operating lever 83 is adapted to extend transversely at the end of the car upon the buffer end of the end sill indicated at E. The operating lever may be secured for movement in any suitable way, one of which is indicated by the eyes 84. The connection between the operating lever 83 and the link 82 is indicated at 85, and the connection between the lever 81 and the link 82 is indicated at 86.

The operating lever 83 is provided with a handle 87 which is adapted to move the operating lever transversely through the eyes indicated at 84. As the operating lever is moved, the link 82 moves outward, which communicates its motion to the lever 81, moving this also outward, and at the same time the valve stem 80 is also moved. Thus the movement of the operating lever 83 may be utilized to control the flow of air through the air line valve or cock 79 depending upon whether or not the cars are coupled together or uncoupled, and thus avoids the necessity of compelling the train-man to pass between the cars to couple and uncouple the air hose coupling.

In Fig. 4 the device is assembled, showing the two air hose couplings about to be brought into contact and be engaged with each other. As they approach each other, the curved face 33 strikes the arm 39, which arm in moving operates the arm 41 by means of the shaft 40. The arm 41 moves slightly backward in the slot 51 by means of the pin 52, and at the same time, the carrier which is pivotally mounted upon the pin 35 has its engaging end moved downward.

At this time the counterweighted end 46 moves upward. In order to use the M. C. B. coupling for the air hose, it is necessary that the two parts of the coupling be brought together, and engaged with a twisting motion, which serves to position the engaging faces and the lugs together in an operative position. The movement communicated to the couplings is automatic, in its connection, and takes place upon both casings and carriers, and the motion that is communicated to the couplings 76 is one that is similar to that performed by hand at present.

As the two casings come into an abutting relation, the arms formed in the sides of the slotted end of the casing engage with each other, and the recesses 34 formed in the curved end 33 are adapted to receive the ends of the levers 39. The recesses 34 are of such size that the ends of the levers 39 are adapted to have some vertical play in order to prevent breakage or bending during the vertical movement of the casings, due to the various vertical plays of the two coupled cars.

In order to facilitate the replacement, the air hose is unscrewed from its screw connection indicated at 77, the pin 49 is withdrawn which permits the housing and clamp to be withdrawn from within the casing at the rear of the slotted portion. The new hose is screwed onto the screw connection 77 in the usual ways, and its housing and clamp are inserted from the rear of the slotted portion of the casing into engagement with the carrier. The pin 49 is then replaced and locked in position.

In order to prevent loss of the pin 49 during this replacement and on its withdrawal, the chain 88 is provided, one end of which is attached to the carrier, while the other end is attached to the curved end 53 of the pin. In order to facilitate the passage of the coupler 76 between the carrier and the upper portion of the casing, the lug 30 is preferably positioned a little to one side of the central line of the casing so that the coupling will readily pass through when turned. This lug also serves as a contact and bearing point for the curved upper portion 67 of the housing so that when the base or body member 59 is pinned in place, this lug 30 serves to prevent vertical play of the housing, carrier, and hose clamp, but does not restrict the logitudinal movement of the hose clamp within the housing.

Interposed between the casing or head 21 and the end 20, there is an arm 89, which as shown in the several figures is substantially square and is of somewhat smaller size than the head or end. This arm 89 is provided on its under surface with a flat portion, which is adapted to engage with an anti-friction bearing 90 carried in a yoke or U-shaped member, the lower wall of which is indicated at 91. This member 91 may be formed of suitable material and is preferably secured to the buffer end of the end sill E of the car or vehicle.

The bearing 90 is so positioned that when the head 21 is swung by means of the counter-weight 27 it may have its movement therein with as little friction as possible so that the full effect of the movement of the counter-balance 27 may be secured.

As shown in Fig. 2, the carrier and its complemental parts are slightly off-set from the center line of the head or casing 21. This is done in order to permit the air hose couplings 76 to better effect their engagement when brought into coupling position.

What is claimed as new is:—

1. An automatic air hose coupling device comprising a head, a carrier pivotally mounted therein, an air hose including a coupling, a clamp therefor, and a housing for said clamp disposed on the carrier.

2. An automatic air hose coupling device comprising a head, a carrier pivotally mounted therein, an air hose including a coupling, a separable clamp therefor, and a housing for the clamp disposed on the carrier.

3. An automatic air hose coupling device comprising a head, a carrier pivotally mounted therein, an air hose including a coupling, a separable clamp therefor, and a housing for the clamp removably disposed on the carrier.

4. An automatic air hose coupling device comprising a head, a carrier including a counterbalance pivotally mounted therein, an air hose including a coupling, a separable clamp therefor, and a housing detachably secured to the carrier.

5. An automatic air hose coupling device comprising a head, a carrier including a counter-balance pivotally mounted therein, a housing detachably secured to the carrier, an air hose including a coupling, and a separable clamp therefor movably mounted within the housing.

6. An automatic air hose coupling device comprising a head, a carrier including a counter-balance pivotally mounted therein, a separable housing detachably secured to the carrier, an air hose including a coupling, and a separable clamp therefor slidably carried in the housing.

7. An automatic air hose coupling device comprising a head, a carrier including a counter-balance projecting angularly therefrom, said carrier being pivotally mounted within the head, and provided with a V-shaped engaging end, a housing provided with a V-shaped recess adapted to engage with the V-shaped engaging end, a lug disposed on the housing, a slot in the carrier for the lug including a pin passing transversely therethrough, and an air hose clamp slidably carried in the housing.

8. An automatic air hose coupling device comprising a slotted end head, an L-shaped carrier pivotally mounted therein and provided with a lug and a counter-balance, one of the abutting ends of the slotted casing being curved, the opposite side of the head being formed to have flat surfaces lying in different planes with a shoulder therebetween, a bell crank lever whose two arms are secured to a shaft that passes through the wall of the thinner section, a lug on the outside of the latter section acting as a stop for one of the arms, the other arm being operatively connected to the lug of the carrier, so that when the curved end of an opposed head strikes the arm, on the thinner section, the carrier is swung on its pivotal mounting against the action of the counterbalance, a housing removably secured on the carrier, and an air hose clamp slidably mounted in the housing.

9. An automatic air hose coupling device comprising a head, a carrier and a housing thereon, an air hose clamp slidably mounted within the housing, an M. C. B. air hose including an M. C. B. coupling carried by the clamp, and means to automatically couple opposed couplings.

10. An automatic air hose coupling device comprising a head mounted on a vehicle, a carrier and a housing thereon, an air hose clamp slidably mounted within the housing, an M. C. B. air hose including an M. C. B. coupling, said clamp being adapted to engage the hose, and means operatively connected to the casing and with the vehicle to change the position of the engaging end of the head and the coupling to compensate for the variations in rail elevations due to banking.

11. An automatic air hose coupling device comprising a head supported for movement from a vehicle, a pivotally mounted carrier disposed therein including a separable housing and an air hose clamp carrying an air hose and coupling movable within the head, securing means for the housing, means operable on coupling of vehicles to move the carrier so that when the hose couplings are in an abutting relation they will be antomatically connected and interlocked.

12. An automatic air hose coupling device comprising a head, a carrier, a separably formed and detachably secured housing mounted on the carrier, and a separable air hose clamp consisting of two parts secured together by screw means passing through lugs carried by one part that are adapted to be seated in recesses including threaded holes formed in the other part.

13. An automatic air hose coupling device comprising a head, a carrier, and a separable housing detachably secured to the carrier, said housing having one part provided with lugs that are adapted to be seated in recesses including threaded holes formed in the other part, and threaded means to coöperate with the lugs, recesses and holes to secure the parts together to permit the housing to have a substantially smooth exterior.

In testimony whereof I affix my signature.

FRANK M. THOMAS.

Copies of this patent may be obtained for five cents each, by addressing the "Commissioner of Patents, Washington, D. C."